J. W. RIGGS.
Truss-Springs.
No. 136,387. Patented March 4, 1873.
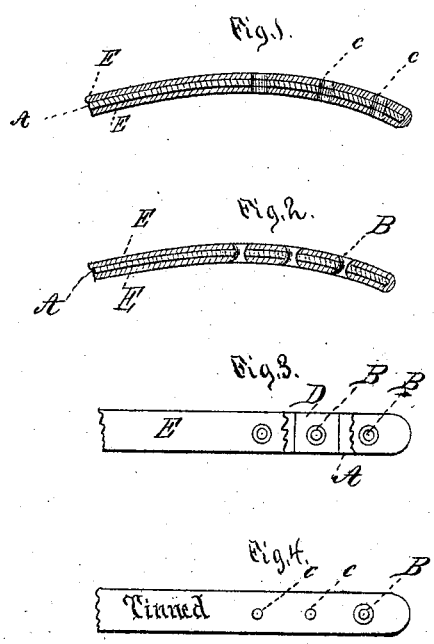

UNITED STATES PATENT OFFICE.

JOHN W. RIGGS, OF BROOKLYN, NEW YORK.

IMPROVEMENT IN TRUSS-SPRINGS.

Specification forming part of Letters Patent No. 136,387, dated March 4, 1873.

*To all whom it may concern:*

Be it known that I, JOHN W. RIGGS, of Brooklyn, in the county of Kings and State of New York, have invented certain new and useful Improvements in Hernial Truss-Springs, &c.; and I do hereby declare that the following is a full, clear, and exact description thereof, that will enable others skilled in the art to which it appertains to make and use the same, reference being had to the accompanying drawing and to the letters of reference marked thereon which form a part of this specification.

My invention relates to certain improvements in metallic springs for hernial trusses, supporters, and other surgical appliances; and it consists in an eyelet or its equivalent, made of some suitable non-corrosive metal, inserted into the screw-holes or other apertures in the spring, and firmly clamped down on both sides of the naked metal. My invention further consists in a coating of tin or tin-foil, or other metal not liable to rust, or linseed-oil, varnish, japan, or other suitable substance impermeable to moisture, applied to the spring previous to the application of a covering of hard rubber.

In the usual mode of manufacturing hard-rubber-covered springs the holes made in the metal for the admission of screws, rivets, &c., are filled up and obliterated by the application of the rubber in a plastic state; and the reopening of the holes by the boring or drilling, after the rubber compound has become vulcanized and hardened, necessarily exposes the edge of the metal to the action of perspiration or other corroding agencies, with the natural and inevitable result of oxidation and destruction of the spring. Moreover, the average width of the springs is such that their strength is greatly impaired, and their liability to break is increased by punching the screw-holes. Another disadvantage existing in the rubber-covered spring is the liability of the rubber to crack so as allow moisture to penetrate to the spring, and thus cause its destruction by oxidation. These disadvantages are entirely obviated in my invention, as hereinafter particularly described and set forth.

In the accompanying drawing, Figure 1 is a longitudinal section, representing a portion of a rubber-covered spring made in the ordinary manner. Fig. 2 is a longitudinal section, representing a portion of a spring with my eyelets inserted in the screw-holes. Fig. 3 is a plan view of one of my rubber-covered springs with a portion of the rubber broken away, showing a screw-hole covered with tin-foil or other similar substance previous to the insertion of the eyelet. Fig. 4 shows a portion of a spring covered with tin or other non-corrosive substance previous to the application of the rubber.

A represents the spring, made of suitable elastic metal. B is the eyelet, inserted in the perforation C and clamped down upon both sides, in the form shown in Fig. 2, so that when the rubber coating E is applied in a plastic state it surrounds the eyelets B, as shown. D represents a piece of tin-foil or other similar impervious substance, with which the perforations may be lined and surrounded previous to the insertion of the eyelet.

After the eyelets have been inserted and secured in the perforations the spring is covered with a coating of tin or other metal not liable to rust, or of linseed-oil, varnish, or other suitable substance impermeable to moisture, so that, if the rubber covering should crack or break sufficiently to admit moisture, the non-corrosive substance will effectually protect the spring from injury by oxidation or corrosion.

The eyelets inserted in the perforations and clamped down, as shown, serve to protect and strengthen the spring at those points which would otherwise be weaker than the other portions.

Having thus described my invention, what I claim as new, and desire to secure by Letters Patent, is—

1. A metallic spring for hernial trusses, supporters, and other surgical appliances, having an eyelet or its equivalent, of non-corrosive material, inserted into the screw-holes or other apertures and clamped down upon the bare metal on both sides, substantially as shown and described.

2. A metallic spring for trusses, &c., covered with a coating of tin or other metal not liable to rust, or of linseed-oil, varnish, japan, or other suitable substance impermeable to moisture, and inclosed in an outer covering of hard rubber, substantially as shown and described.

In testimony that I claim the foregoing I have hereunto set my hand this 6th day of November, 1872.

JOHN W. RIGGS.

Witnesses:
 W. V. NEWMAN,
 W. S. PAINE.